US009434385B2

(12) United States Patent
Miyashita

(10) Patent No.: US 9,434,385 B2
(45) Date of Patent: Sep. 6, 2016

(54) CHARGE CONTROL DEVICE, VEHICLE CONTROL DEVICE, VEHICLE, CHARGE CONTROL METHOD AND VEHICLE CONTROL METHOD

(71) Applicant: TOYOTA JIDOSHA KABUSHIKI KAISHA, Toyota-shi, Aichi-ken (JP)

(72) Inventor: Michihiro Miyashita, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/778,676

(22) PCT Filed: Apr. 1, 2013

(86) PCT No.: PCT/JP2013/002260
§ 371 (c)(1),
(2) Date: Sep. 21, 2015

(87) PCT Pub. No.: WO2014/162345
PCT Pub. Date: Oct. 9, 2014

(65) Prior Publication Data
US 2016/0046292 A1 Feb. 18, 2016

(51) Int. Cl.
*B60W 30/188* (2012.01)
*F02D 29/06* (2006.01)
(Continued)

(52) U.S. Cl.
CPC .......... *B60W 30/1886* (2013.01); *B60W 10/06* (2013.01); *B60W 10/26* (2013.01);
(Continued)

(58) Field of Classification Search
CPC .......................... B60W 30/188; B60W 10/06
See application file for complete search history.

(56) References Cited

U.S. PATENT DOCUMENTS 5,614,809 A * 3/1997 Kiuchi ............... B60K 6/46
180/65.245
6,534,950 B2 * 3/2003 LeBoe ............ H01M 8/04373
320/103

(Continued)

FOREIGN PATENT DOCUMENTS

JP    2004-176624 A    6/2004
JP    2005-067293 A    3/2005
(Continued)

*Primary Examiner* — Thomas Tarcza
*Assistant Examiner* — Alex C Dunn
(74) *Attorney, Agent, or Firm* — Sughrue Mion, PLLC

(57) ABSTRACT

A charge control device for a battery is mounted on a vehicle, the vehicle comprises an engine, a generator driven with power of the engine, the battery configured to be chargeable with electric power generated by the generator, and auxiliary machinery operated with electric power of the battery. The charge control device comprises: a load condition detector that is configured to detect a load condition of the auxiliary machinery; and a charge controller that is configured to control charging into the battery, based on the load condition of the auxiliary machinery, wherein in response to detection of a state change from a state in which a magnitude of the load of the auxiliary machinery is smaller than a predetermined threshold value to a state in which a magnitude of the load is larger than the predetermined threshold value, the charge controller controls a generated voltage by the generator based on the magnitude of the load of the auxiliary machinery prior to the state change during a time period until a specified time has elapsed after the detection of the state change, and the charge controller controls a generated voltage by the generator based on a magnitude of the load of the auxiliary machinery detected by the load condition detector during a time period after elapse of the specified time.

7 Claims, 13 Drawing Sheets

(51) Int. Cl.
*F02D 17/02* (2006.01)
*B60W 10/06* (2006.01)
*B60W 10/26* (2006.01)
*B60W 10/30* (2006.01)

(52) U.S. Cl.
CPC ............ *B60W 10/30* (2013.01); *F02D 17/02* (2013.01); *F02D 29/06* (2013.01); *B60W 2510/244* (2013.01); *B60W 2530/00* (2013.01); *B60W 2710/065* (2013.01); *B60W 2710/244* (2013.01)

(56) References Cited

U.S. PATENT DOCUMENTS

| | | | | |
|---|---|---|---|---|
| 6,630,810 B2 * | 10/2003 | Takemasa | ........... | B60L 11/1851 307/10.1 |
| 6,744,237 B2 * | 6/2004 | Kopf | ................ | B60L 11/1887 320/104 |
| 6,795,756 B1 * | 9/2004 | Zhang | ............... | H01M 8/04888 180/65.29 |
| 7,693,637 B2 * | 4/2010 | Mensler | ................ | B60K 6/387 180/65.6 |
| 7,957,856 B2 * | 6/2011 | Itoh | ....................... | B60K 6/445 180/65.21 |
| 8,770,165 B2 * | 7/2014 | Mizuno | .................. | F02D 29/06 123/179.3 |
| 2013/0314052 A1 * | 11/2013 | Nomoto | ................ | H02J 7/1446 320/155 |
| 2014/0330473 A1 | 11/2014 | Miyashita et al. | | |
| 2016/0102644 A1 * | 4/2016 | Ouchi | ..................... | B60K 6/26 290/31 |

FOREIGN PATENT DOCUMENTS

| | | |
|---|---|---|
| JP | 2007-230513 A | 9/2007 |
| JP | 2008-238856 A | 10/2008 |
| JP | 2011-163281 A | 8/2011 |
| WO | 2013/105132 A1 | 7/2013 |

* cited by examiner

SOC DISTRIBUTION REQUEST LEVEL CALCULATION MAP MP

After elapse of the mask period, the calculated value follows the battery discharge current.
This accelerates power generation and decreases the battery discharge current.

CHARGE CONTROL DEVICE, VEHICLE CONTROL DEVICE, VEHICLE, CHARGE CONTROL METHOD AND VEHICLE CONTROL METHOD

CROSS REFERENCE TO RELATED APPLICATIONS

This is a National Stage of International Application No. PCT/JP2013/002260 filed Apr. 1, 2013, the contents of which are incorporated herein by reference in its entirety.

TECHNICAL FIELD

The present invention relates to a charge control device for a battery mounted on a vehicle, a vehicle control device, a vehicle, a charge control method and a vehicle control method.

BACKGROUND ART

An automobile has an engine and a battery, wherein the battery is charged with power of the engine. A known technique of charge control for charging the battery suppresses the battery from being charged during normal running to save the amount of fuel consumption, while allowing the battery to be charged by regenerative power generation during deceleration running.

Idle reduction control is also known as the technology to save the amount of fuel consumption. Patent Literature 1 given below discloses an automobile having both the function of charge control and the function of idle reduction control, in order to meet the requirement for improvement of fuel consumption. A known configuration of a charge control device increases the generated voltage of an alternator with an increase in consumed current of auxiliary machinery (for example, Patent Literature 4).

CITATION LIST

Patent Literatures

PTL 1: JP 2005-67293A
PTL 2: JP 2011-163281A
PTL 3: JP 2004-176624A
PTL 4: JP 2007-230513A

SUMMARY OF INVENTION

Technical Problem

The above technique, however, may cause a restart of the engine with a decrease in SOC (state of charge), due to consumption of electricity accumulated in the battery by auxiliary machinery during an engine stop in idle reduction control. "SOC" is an index indicating how much electric power remains in the battery. In some cases, for example, during lighting of indicators or stop lamps or during operation of power steering or power windows, a large amount of electricity accumulated in the battery may be consumed. Controlling the power generation of the generator based on such high current causes an increase in fuel consumption. It is accordingly preferable to regard such consumption of high current as noise and exclude such high current from a control condition of power generation. Lighting of indicators or stop lamps may continue for a relatively long time. Completely excluding such high current as the noise from the control condition of power generation of the generator is, however, more likely to decrease the SOC of the battery. This is thus more likely to cause a restart of the engine during an engine stop in idle reduction control.

Solution to Problem

In order to achieve at least part of the foregoing, the present invention provides various aspects described below.

(1) According to one aspect of the invention, there is provided a charge control device for a battery mounted on a vehicle, the vehicle comprising an engine, a generator driven with power of the engine, the battery configured to be chargeable with electric power generated by the generator, and auxiliary machinery operated with electric power of the battery. The charge control device comprises: a load condition detector that is configured to detect a load condition of the auxiliary machinery; and a charge controller that is configured to control charging into the battery, based on the load condition of the auxiliary machinery, wherein in response to detection of a state change from a state in which a magnitude of the load of the auxiliary machinery is smaller than a predetermined threshold value to a state in which a magnitude of the load is larger than the predetermined threshold value, the charge controller controls a generated voltage by the generator based on the magnitude of the load of the auxiliary machinery prior to the state change during a time period until a specified time has elapsed after the detection of the state change, and the charge controller controls a generated voltage by the generator based on a magnitude of the load of the auxiliary machinery detected by the load condition detector during a time period after elapse of the specified time. In the charge control device according to this aspect, even in the case of an instantaneous state change from the state in which a load condition of the auxiliary machinery is smaller than the predetermined threshold value to the state in which a load condition of the auxiliary machinery is larger than the predetermined threshold value, this state change is excluded as noise during the time period until elapse of the specified time, and the generated voltage of the generator is controlled based on the load state of the auxiliary machinery prior to the state change. When the load condition of the auxiliary machinery indicates a steady increase in load that continues for a relatively longer time period than the specified time, the generated voltage of the generator is controlled based on the detected load condition.

(2) The charge control device according to the aspect before, wherein the vehicle includes a starter configured to start the engine, and the threshold value may be a value that is larger than current consumption of the auxiliary machinery in an idle reduction state of the engine but may be smaller than current consumption of the starter. The charge control device according to this aspect enables the threshold value to be set to a smaller value than cracking current.

(3) The charge control device according to the aspect before, wherein the charge controller may use an observed value of electric current of the auxiliary machinery to obtain a calculated value of electric current of the auxiliary machinery for controlling the generated voltage by the generator, and when obtaining the calculated value of electric current of the auxiliary machinery, the charge controller may perform a smoothing process that reduces a variation in the calculated value of electric current of the auxiliary machinery to be smaller than a variation in the observed value of electric current of the auxiliary machinery. The charge control device according to this aspect performs the smoothing process when obtaining the calculated value of electric current of the auxiliary machinery, thus enabling the calculated value of electric current of the auxiliary machinery to moderately follow the observed value of electric current of the auxiliary machinery.

(4) According to one aspect of the invention, there is provided a vehicle control device mounted on a vehicle, the vehicle comprising an engine, a generator driven with power of the engine, a battery configured to be chargeable with electric power generated by the generator, and auxiliary machinery operated with electric power of the battery. The vehicle control device may comprise the charge control device according to any one of the aspects before; an idle reduction controller that is configured to perform idle reduction control of the engine; and an SOC detector that is configured to detect a state of charge (SOC) of the battery. The charge control device may further comprise an idle reduction capacity setter that is configured to set, during running of the vehicle, a capacity for idle reduction in an available SOC range of the battery, based on the load of the auxiliary machinery, wherein the capacity for idle reduction is expected to be used in a stop and start period from an engine stop to an engine restart by the idle reduction control; and a remaining capacity controller that is configured to control an amount of power generation by the generator so as to avoid a remaining capacity in the available SOC range, which corresponds to the SOC detected by the SOC detector, from becoming smaller than the capacity for idle reduction during running of the vehicle. In the vehicle control device according to this aspect, the amount of power generation by the generator is controlled during running of the vehicle, such as to avoid the remaining capacity in the available SOC range of the battery from becoming smaller than the capacity for idle reduction, which is expected to be used in the stop and start period. This suppresses a restart of the engine due to the insufficient SOC in the middle of the stop and start period. An increase in SOC with an increase in power during operation of the engine has the higher effect on fuel consumption per unit SOC (for example, 1% SOC), compared with a restart of the engine due to the insufficient SOC in the middle of the stop and start period. This accordingly improves the fuel consumption of the vehicle. Additionally, even in the case of an instantaneous state change from the state in which a load condition of the auxiliary machinery is smaller than the predetermined threshold value to the state in which a load condition of the auxiliary machinery is larger than the predetermined threshold value, this state change is excluded as noise during the time period until elapse of the specified time, and the generated voltage of the generator is controlled based on the load state of the auxiliary machinery prior to the state change. When the load condition of the auxiliary machinery indicates a steady increase in load that continues for a relatively longer time period than the specified time, the generated voltage of the generator is controlled based on the detected load condition.

(5) According to one aspect of the invention, there is provided a vehicle. This vehicle may comprise an engine; a battery that is configured to be chargeable with electric power generated by a generator that is driven with power of the engine; auxiliary machinery that is operated with electric power of the battery; and the vehicle control device according to the aspect before.

(6) According to one aspect of the invention, there is provided a charge control method for a battery mounted on a vehicle, the vehicle comprising an engine, a generator driven with power of the engine, the battery configured to be chargeable with electric power generated by the generator, and auxiliary machinery operated with electric power of the battery. The charge control method may comprise the steps of: (a) detecting magnitude of a load of the auxiliary machinery; (b) determining whether there is a state change from a state in which a magnitude of the load of the auxiliary machinery is smaller than a predetermined threshold value to a state in which a magnitude of the load is larger than the predetermined threshold value; and (c) controlling charging into the battery based on the magnitude of the load of the auxiliary machinery. In response to detection of the state change from the state in which a magnitude of the load of the auxiliary machinery is smaller than the predetermined threshold value to the state in which a magnitude of the load is larger than the predetermined threshold value in the step (b), in the step (c), a generated voltage by the generator is controlled based on the magnitude of the load of the auxiliary machinery prior to the state change during a time period until a specified time has elapsed after the detection of the state change, while a generated voltage by the generator is controlled based on the detected magnitude of the load of the auxiliary machinery during a time period after elapse of the specified time.

(7) According to one aspect of the invention, there is provided a vehicle control method of controlling a vehicle, the vehicle comprising an engine, a generator driven with power of the engine, a battery configured to be chargeable with electric power generated by the generator, and auxiliary machinery operated with electric power of the battery. In addition to the steps of the charge control method according to the aspect before, the vehicle control method may comprise the steps of: (d) performing idle reduction control; (e) detecting a state of charge (SOC) of the battery; (f) measuring a current value of electric current flowing through the auxiliary machinery; (g) obtaining a calculated value of electric current of the auxiliary machinery by performing a smoothing process that reduces a variation in calculated value of electric current of the auxiliary machinery to be smaller than a variation in observed value of electric current of the auxiliary machinery; and (h) setting, during running of the vehicle, a capacity for idle reduction in an available SOC range of the battery, based on a current value corrected in the step (g), wherein the capacity for idle reduction is expected to be used in a stop and start period from an engine stop to an engine restart by the idle reduction control, wherein in the step (c), an amount of power generation by the generator is further controlled so as to avoid a remaining capacity in the available SOC range, which corresponds to the SOC detected in the step (e), from becoming smaller than the capacity for idle reduction during running of the vehicle.

The invention may be implemented by a variety of aspects other than the charge control device for battery, for example, a vehicle control device, a vehicle, a charge control method and a vehicle control method.

DESCRIPTION OF EMBODIMENT

Figure 1:
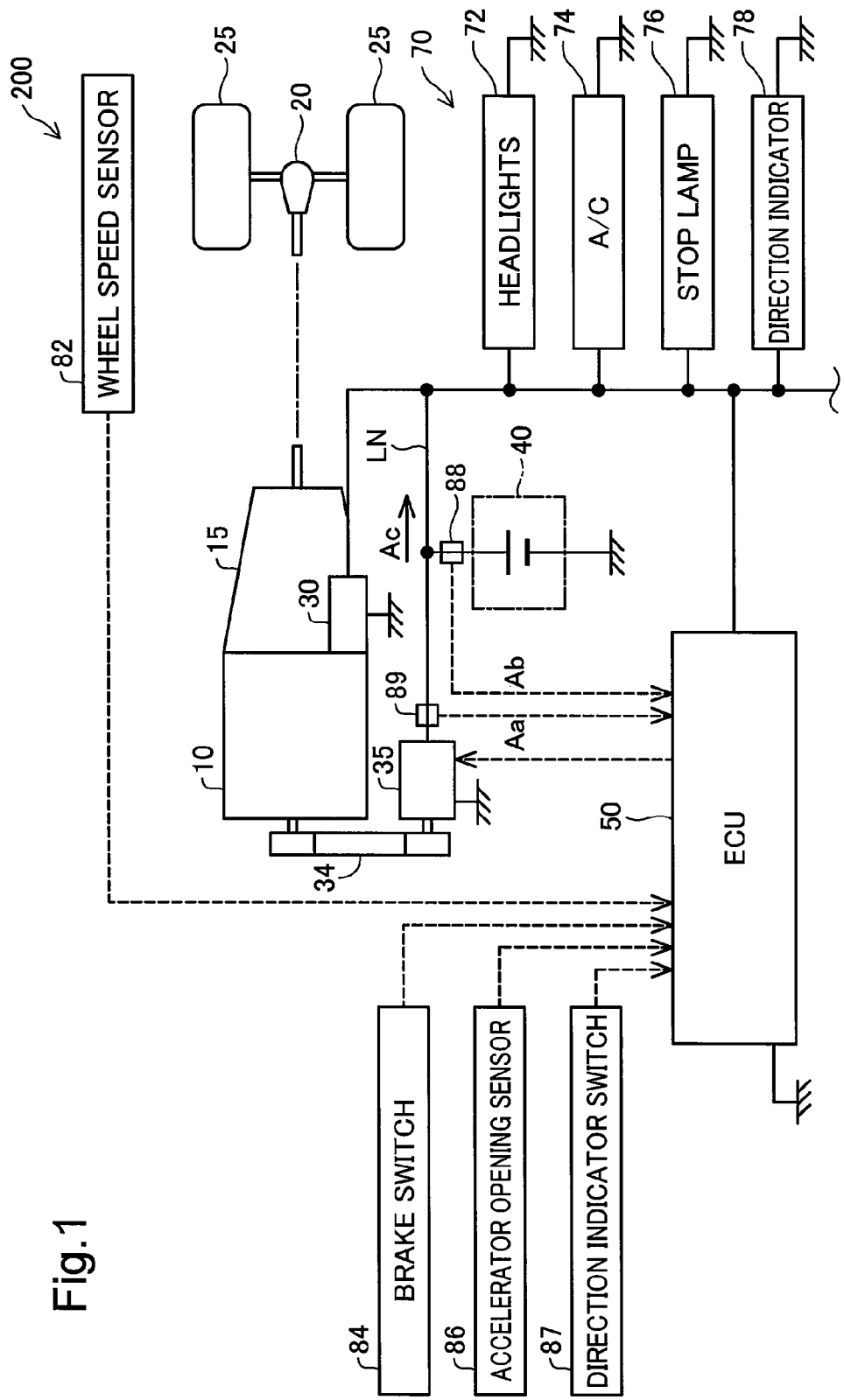
FIG. 1 is a diagram illustrating the configuration of an automobile according to an embodiment of the invention.

Some aspects of the invention are described below with reference to embodiments in the following sequence:
A. General Configuration
B. Configuration of ECU
C. Configuration of Target SOC Estimator
D. Configuration of Vehicle State Predictor
E. Functions and Advantageous Effects
F. Modifications A. General Configuration FIG. 1 is a diagram illustrating the configuration of an automobile 200 according to an embodiment of the invention. The automobile 200 is a vehicle having idle reduction function. The automobile 200 includes an engine 10, an automatic transmission 15, a differential gear 20, drive wheels 25, a starter 30, an alternator 35, a battery 40 and an electronic control unit (ECU) 50.

The engine 10 is an internal combustion engine that generates power by combustion of a fuel such as gasoline or light oil. The power of the engine 10 is transmitted to the automatic transmission 15, while being transmitted to the alternator 35 via a drive mechanism 34. The output of the engine 10 is changed by an engine control computer (not shown) according to the pressure of an accelerator pedal (not shown) stepped on by the driver.

The automatic transmission 15 automatically changes the gear ratio (so-called gear shifting). The power (rotation speed·torque) of the engine 10 is subjected to gear shifting by the automatic transmission 15 and is transmitted as a desired rotation speed·torque via the differential gear 20 to the left and right drive wheels 25. The power of the engine 10 is changed according to the accelerator pedal pressure and is transmitted via the automatic transmission 15 to the drive wheels 25 to accelerate or decelerate the vehicle (automobile 200).

The alternator 35 is a generator configured to generate electric power using part of the power of the engine 10. The generated electric power is used to charge the battery 40 via an inverter (not shown). In the description hereof, power generation by the alternator 35 using the power of the engine 10 is called "fuel power generation". The alternator 35 corresponds to the "generator" described in [Solution to Problem]. The drive mechanism 34 serves to transmit the power of the engine 10 to the alternator 35. According to this embodiment, the belt drive configuration is employed for the drive mechanism 34.

The battery 40 is a secondary battery of lead acid cells and serves as a DC power supply of a voltage of 14 V. The battery 40 supplies electric power to peripheral devices provided other than the engine main body. In the description hereof, the peripheral devices provided other than the engine main body and operated with electric power of the battery 40 are called "auxiliary machines". The group of auxiliary machines is called "auxiliary machinery". The automobile 200 includes, for example, head lights 72, an air conditioner (A/C) 74, a stop lamp 76 and a direction indicator 78 as the auxiliary machinery 70. The auxiliary machinery 70 include the starter 30 described above.

The starter 30 is a device configured to start the engine 10 using the electric power supplied from the battery 40 and includes a starter motor (not shown). In general, when the driver operates an ignition switch (not shown) to start driving an automobile at a stop, the starter 30 is activated to start the engine 10. This starter 30 is used to restart the engine 10 in the no idling state as described later. In the description hereof, the no idling state means the engine stop state by idle reduction control. When the starter 30 is operated, instantaneous high current called cracking current is generated.

The ECU 50 includes a CPU that performs computer programs, a ROM that stores computer programs and others, a RAM that temporarily stores data and input/output ports connected with, for example, various sensors, switches, actuators and lights. The sensors and switches connected with the ECU 50 include: a wheel speed sensor 82 that detects the rotation speed of the drive wheels 25; a brake switch 84 that detects depression or non-depression of a brake pedal (not shown): an accelerator opening sensor 86 that detects the operation amount of an accelerator pedal (not shown) as an accelerator opening; a battery current sensor 88 that detects the charge-discharge current of the battery 40; an alternator current sensor 89 that detects the output current of the alternator 35; and a direction indicator switch 87 that gives an instruction to operate a direction indicator. The actuators include the starter 30 and the alternator 35. The ECU 50 receives the supply of electric power from the battery 40.

The ECU 50 controls the starter 30 and the alternator 35 based on signals from the various sensors and switches mentioned above and an engine control computer (not shown), so as to control engine stops and restarts (idle reduction control) and controls the SOC of the battery 40. This ECU 50 is the vehicle control device directly involved in the invention. The ECU 50 also performs controls to light up the stop lamp 76 in response to the ON state of the brake switch 84 and flash the lamp of a direction indicator 78 in response to the ON state of the direction indicator switch 87.

B. Configuration of ECU

Figure 2:
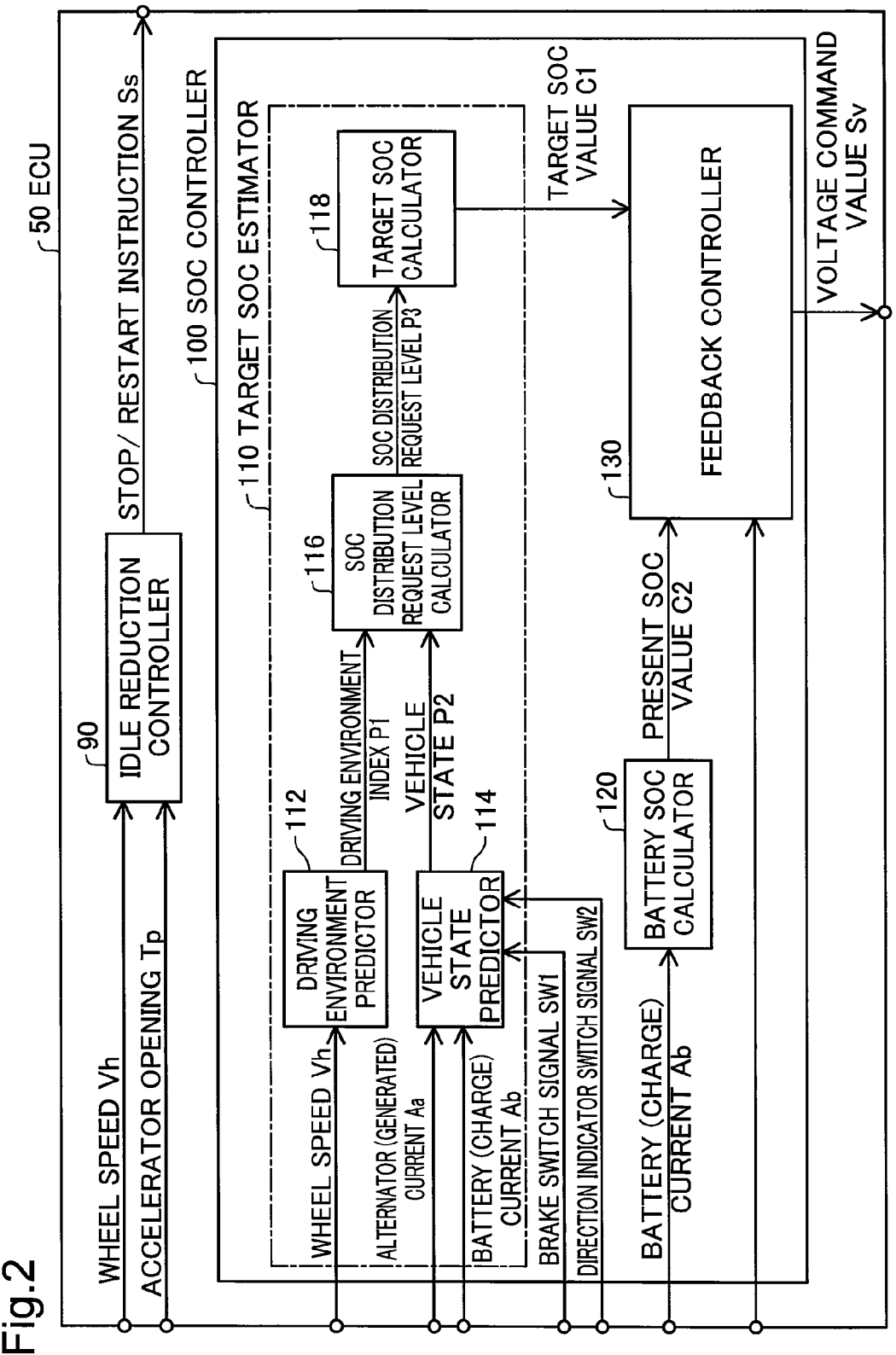
FIG. 2 is a diagram illustrating the functional configuration of the ECU.

FIG. 2 is a diagram illustrating the functional configuration of the ECU 50. As illustrated, the ECU 50 includes an idle reduction controller 90 and an SOC controller 100. The functions of the idle reduction controller 90 and the SOC controller 100 are actually implemented by the CPU included in the ECU 50 executing the computer programs stored in the ROM.

The idle reduction controller 90 obtains a wheel speed Vh detected by the wheel speed sensor 82 and an accelerator opening Tp detected by the accelerator opening sensor 86 and outputs an instruction Ss to stop/start the engine 10 to the starter 30. More specifically, the idle reduction controller 90 determines that an engine stop condition is satisfied and outputs an engine stop instruction Ss to the starter 30, when the wheel speed Vh is reduced below a predetermined speed (for example, 10 km/h). The idle reduction controller 90 determines that an engine restart condition is satisfied and outputs an engine restart instruction Ss to the starter 30, when depression of the accelerator pedal is subsequently detected based on the accelerator opening Tp.

In other words, the idle reduction controller 90 stops the engine 10 when the engine stop condition is satisfied, and restarts the engine 10 when the engine restart condition is satisfied after the engine stop. The engine stop condition and the engine restart condition are not limited to those described above. For example, the engine stop condition may be that the wheel speed Vh is fully reduced to 0 km/h, and the engine restart condition may be that the driver releases the brake pedal.

The SOC controller 100 includes a target SOC estimator 110, a battery SOC calculator 120 and a feedback controller 130. The target SOC estimator 110 estimates an SOC expected to be used during a time period from an engine stop to an engine restart (hereinafter called "stop and start period") by idle reduction control during vehicle running (for example, when the wheel speed Vh>0 km/h), as a target SOC (hereinafter also called "target SOC value") C1. The detailed configuration will be described in Chapter C. The target SOC estimator 110 corresponds to the "idle reduction capacity setting section" described in [Solution to Problem]. The "SOC" herein is defined as a value obtained by dividing the electric charge remaining in the battery by the electric charge accumulated in the battery in the fully charged state.

The battery SOC calculator 120 calculates a current SOC (hereinafter called "present SOC value") C2 of the battery 40, based on charge-discharge current (called "battery current") of the battery 40 detected by the battery current sensor 88. More specifically, the battery SOC calculator 120 calculates the present SOC value C2 by integrating the charge-discharge currents Ab with setting the charge currents of the battery 40 to positive values and setting the discharge currents of the battery 40 to negative values. The configuration of the battery current sensor 88 and the battery SOC calculator 120 corresponds to the "SOC detector" described in [Solution to Problem]. The SOC detector is not necessarily limited to the configuration that makes a calculation based on the battery current detected by the battery current sensor 88 but may be configured to make a calculation based on, for example, a battery electrolytic solution specific gravity sensor, a cell voltage sensor or a battery terminal voltage sensor. Moreover, the SOC detector is not necessarily limited to the configuration that detects the electric charge remaining in the battery but may be configured to detect the state of charge using another parameter, for example, a chargeable amount.

The feedback controller 130 calculates a difference by subtracting the present SOC value C2 from the target SOC value C1 during vehicle running and determines a voltage command value Sv that makes the calculated difference equal to a value 0 by feedback control. This voltage command value Sv indicates the amount of power to be generated by the alternator 35 and is sent to the alternator 35. As a result, the present SOC value C2 is controlled to the target SOC value C1 by fuel power generation. The feedback controller 130 corresponds to the "remaining capacity controller" described in [Solution to Problem].

The SOC controller 100 has a function called "battery control" and a function called "charge control", in addition to the above functions, although not specifically illustrated. The following describes battery control. The battery or more specifically the lead acid battery of the embodiment has a predetermined available SOC range (operable SOC range) based on the need for prolonged life. Accordingly, the "battery control" is performed to increase the power of the engine 10 and thereby increase the SOC into the above SOC range when the SOC of the battery 40 becomes lower than a lower limit (for example, 60%) of this SOC range and to consume the SOC and thereby decrease the SOC into the above SOC range when the SOC exceeds an upper limit (for example, 90%) of the SOC range. When the SOC becomes lower than the lower limit during an engine stop by idle reduction control, the engine is restarted to increase the SOC into the above SOC range by fuel power generation.

The "charge control" is a control process that suppresses the battery from being charged by fuel power generation during normal running to save fuel consumption and charges the battery by regenerative power generation during deceleration running. The charge control is a known configuration and is thus not specifically described here, but basically performs the following operations. In the charge control, feedback control by the feedback controller 130 during normal running is performed when the target SOC value C1 is greater than the present SOC value C2; a specified power generation cutoff voltage is set to the voltage command value Sv, which is given to the alternator 35, when the target SOC value C1 is equal to or less than the present SOC value C2. This configuration suppresses charging during normal running and saves fuel consumption. The "normal running" herein denotes the state of the automobile 200 other than "vehicle stop" when the vehicle speed is 0 km/h and "deceleration running" when the regenerative power generation described above is performed.

C. Configuration of Target SOC Estimator

The target SOC estimator 110 includes a driving environment predictor 112, a vehicle state predictor 114, an SOC distribution request level calculator 116 and a target SOC calculator 118.

The driving environment predictor 112 predicts the driving environment. The "driving environment" herein is a parameter indicating the extent that the vehicle falls in idle reduction state in the future (from now) and, in other words, a parameter regarding the ratio of a stop and start period in a future predetermined period. The "driving environment" accordingly means the driving environment of the vehicle that causes a vehicle stop by idle reduction control. The driving environment predictor 112 calculates a driving environmental index, which indicates the driving environment by an index, based on a wheel speed Vh detected by the wheel speed sensor 82. more specifically, the driving environment predictor 112 calculates a ratio R of vehicle stop time in a last predetermined period (for example, in last 10 minutes) going back from the present based on the wheel speed Vh and calculates a driving environment index P1 from this calculated ratio R. A concrete procedure counts the total vehicle stop time when the wheel speed Vh is equal to a value 0 in a predetermined period, divides the total vehicle stop time by the total time of the predetermined period to calculate the ratio R and calculates the driving environment index P1 from the ratio R.

The high ratio R indicates a high frequency of vehicle stops and a long vehicle stop time and thereby leads to prediction of a high frequency of future vehicle stops and a long future vehicle stop time. This embodiment accordingly determines the driving environment index P1 as follows:

When the ratio R of vehicle stop time in 10 minutes<38%, the driving environment index P1 is set to a value 1;

When 38%≤the ratio R of vehicle stop time in 10 minutes<42%, the driving environment index P1 is set to a value 2;

When 42%≤the ratio R of vehicle stop time in 10 minutes<46%, the driving environment index P1 is set to a value 3; and When the ratio R of vehicle stop time in 10 minutes≥46%, the driving environment index P1 is set to a value 4.

The above reference values 38%, 42% and 46% are not restrictive but may be replaced with other numerical values. The settings of the driving environment index P1 are not limited to the four values 1 to 4 but may be any other suitable number of values, for example, three values, five values or six values. In general, the suburban area has the lower driving environment index P1, and the urban area has the higher driving environment index P1, so that the higher driving environment index P1 indicates the higher degree of urbanization.

The embodiment determines the driving environment index P1 based on the wheel speed Vh detected by the wheel speed sensor 82, but the invention is not limited to this configuration. For example, the driving environment index P1 may be determined, based on an average value of vehicle speed detected by a vehicle speed sensor, a variation in wheel speed Vh (acceleration) detected by the wheel speed sensor 82, a gear position of a manual transmission in an MT (manual transmission) vehicle or a gear ratio of an automatic transmission in an AT (automatic transmission) vehicle. The lower average value of the vehicle speed indicates the higher degree of urbanization, so that the higher value is set to the driving environment index P1 at the lower average value of vehicle speed. The higher variation in wheel speed Vh indicates the higher degree of urbanization, so that the higher value is set to the driving environment index P1 at the higher variation in wheel speed Vh. The higher frequency of shift in gear position of the manual transmission indicates the higher degree of urbanization, so that the higher value is set to the driving environment index P1 at the higher frequency of shift in gear position of the manual transmission. The higher frequency of change in gear ratio of the automatic transmission indicates the higher degree of urbanization, so that the higher value is set to the driving environment index P1 at the higher frequency of change in gear ratio of the automatic transmission.

The driving environment index P1 may not be necessarily determined based on only one parameter selected among the wheel speed Vh and the respective parameters in place of the wheel speed Vh described above, but may be determined based on two or more of these parameters. In the application using two or more parameters, it is preferable to determine the driving environment index P1 by multiplying the respective parameters by individual weighting factors. Using the wheel speed Vh and the respective parameters in place of the wheel speed Vh described above enables the driving environment to be predicted only in the autonomous system, i.e., the automobile 200. Alternatively the driving environment index P1 may be determined, based on information obtained from outside of the autonomous system. The information obtained from outside of the autonomous system is, for example, road map information of the navigation system. This application may identify whether a future driving area is an urban area or a suburban area based on the road map information of the navigation system and determine the driving environment index P1.

The vehicle state predictor 114 predicts the state of the automobile 200 (vehicle state). The "vehicle state" herein is a parameter indicating how much SOC the automobile 200 is expected to consume hereafter. More specifically, the vehicle state predictor 114 calculates the amount of electric power consumed by the auxiliary machinery 70 based on an alternator current value Aa detected by the alternator current sensor 89, the battery current value Ab detected by the battery current sensor 88, and outputs the calculated amount of electric power as a vehicle state P2. The SOC consumption rate increases with an increase in amount of electric power consumed by the auxiliary machinery 70. According to the embodiment, the vehicle state predictor 114 thus predicts the amount of electric power consumed by the auxiliary machinery 70 as the vehicle state P2. The detailed procedure of calculating the amount of electric power consumed by the own vehicle will be described in Chapter D.

The driving environment predictor 112 and the vehicle state predictor 114 of the above configuration continually perform the predictions after the automobile 200 starts operation. The respective components 122 to 124 are actually implemented by the CPU included in the ECU 50 executing the computer programs stored in the ROM. The driving environment index P1 predicted by the driving environment predictor 112 and the vehicle state P2 predicted by the vehicle state predictor 114 are sent to an SOC distribution request level calculator 116.

The SOC distribution request level calculator 116 calculates an SOC distribution request level P3 based on the driving environment index P1 and the vehicle state P2. The target SOC calculator 118 calculates a target SOC value C1 based on the SOC distribution request level P3. The following describes the detailed processes of the SOC distribution request level calculator 116 and the target SOC calculator 118.

Figure 3:
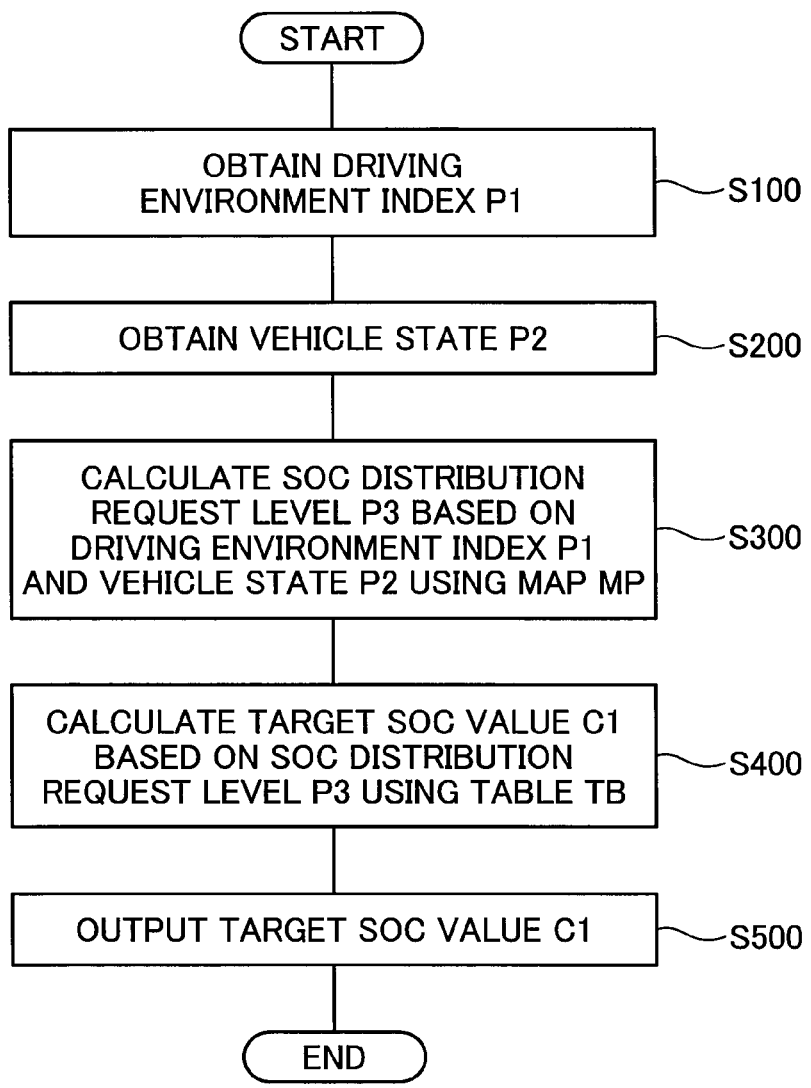
FIG. 3 is a flowchart showing a target SOC estimation routine.

FIG. 3 is a flowchart showing a target SOC estimation routine. This target SOC estimation routine is performed repeatedly at predetermined time intervals (for example, 60 sec) during vehicle running. In other words, the target SOC estimation routine is not performed during a stop of the engine 10 by idle reduction control. As illustrated, when the process flow starts, the CPU of the ECU 50 obtains the driving environment index P1 predicted by the driving environment predictor 112 (FIG. 2) (step S100) and also obtains the vehicle state P2 predicted by the vehicle state predictor 114 (FIG. 2) (step S200).

After execution of step S200, the CPU calculates an SOC distribution request level based on the driving environment index P1 and the vehicle state P2 by using an SOC distribution request level calculation map MP (step S300). The available SOC range is set for each type of battery as described above. The procedure of the embodiment distributes the available SOC range into an SOC range for idle reduction and an SOC range for charge control. The "SOC distribution request level" herein is a parameter specifying the level of the above distribution.

Figure 4:
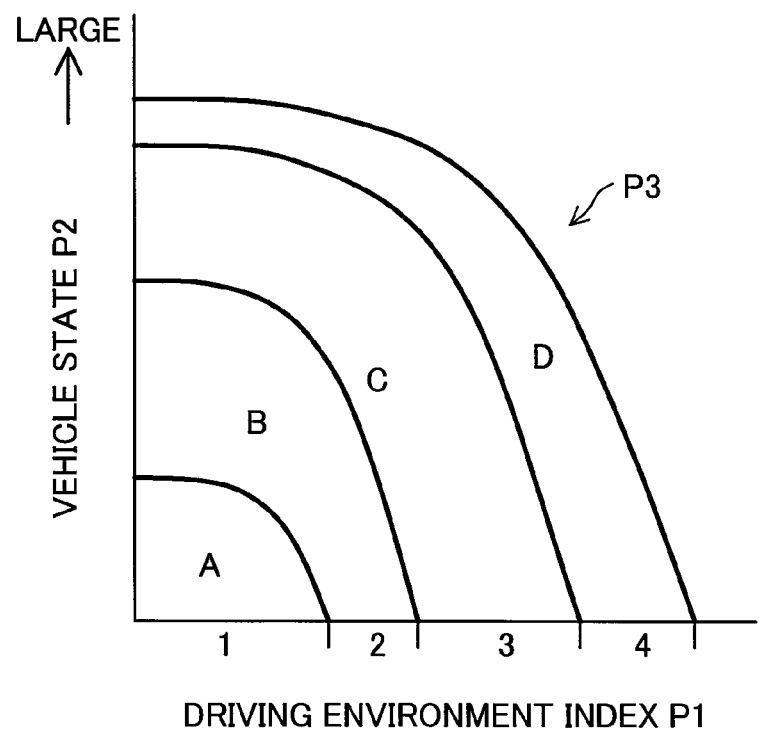
FIG. 4 is a diagram illustrating the SOC distribution request level calculation map MP.

FIG. 4 is a diagram illustrating the SOC distribution request level calculation map MP. As illustrated, the SOC distribution request level calculation map MP has the driving environment index P1 as abscissa and the vehicle state P2 as ordinate and stores map data to map the SOC distribution request level P3 related to the value on the abscissa and the value on the ordinate. The SOC distribution request level calculation map MP is created by determining the relationship of the SOC distribution request level P3 to the driving environment index P1 and the vehicle state P2 in advance experimentally or by simulation and is stored in the ROM. The process of step S300 reads the SOC distribution request level calculation map MP from the ROM and refers to this map MP to obtain the SOC distribution request level P3 related to the driving environment index P1 obtained at step S100 and the vehicle state P2 obtained at step S200. In the illustrated example, four value, A, B, C and D are provided as the SOC distribution request level P3. The values descend in the order of D, C, B and A. The SOC distribution request level P3 increases with an increase in the driving environment index P1. The SOC distribution request level P3 increases with an increase in the vehicle state P2.

Referring back to FIG. 3, after execution of step S300, the CPU calculates the target SOC value C1 based on the SOC distribution request level P3 by using a target SOC calculation table TB (step S400).

Figure 5:
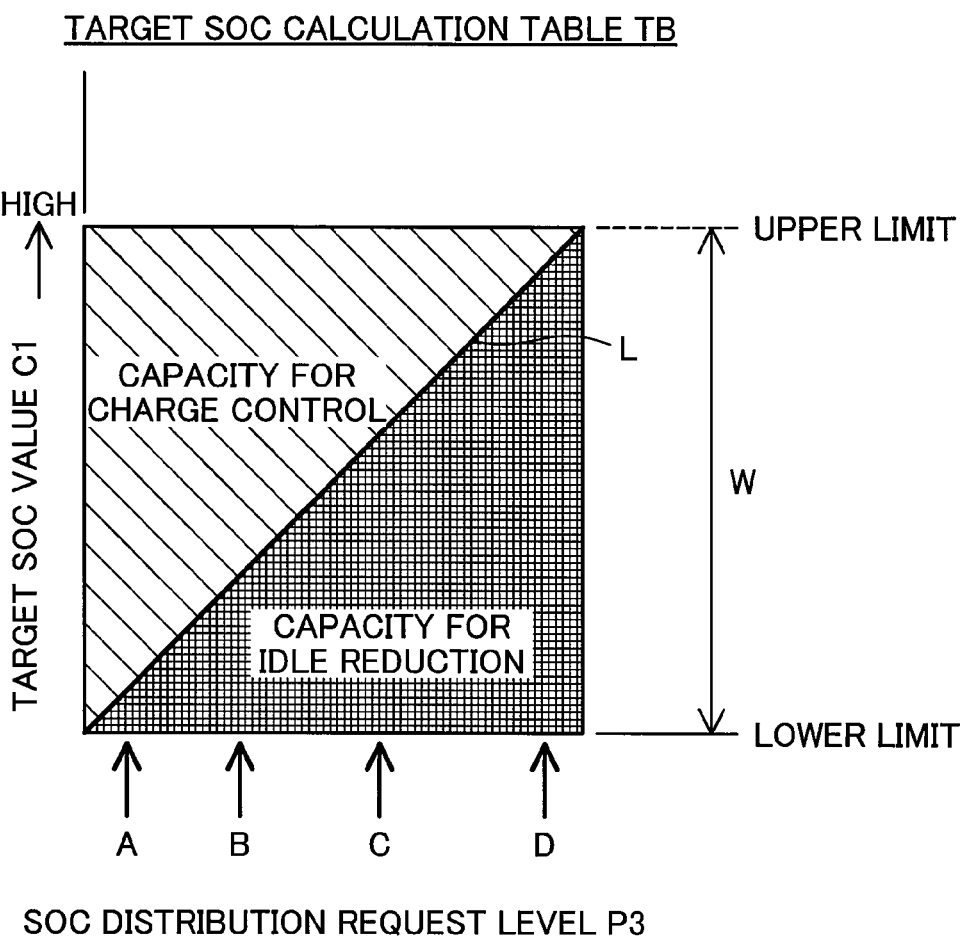
FIG. 5 is a diagram illustrating the target SOC calculation table TB.

FIG. 5 is a diagram illustrating the target SOC calculation table TB. As illustrated, the target SOC calculation table TB has the SOC distribution request level P3 as abscissa and the target SOC value C1 as ordinate and shows the relationship of the target SOC value C1 to the SOC distribution request level P3 by a linear line L. The target SOC calculation table TB is created by determining the relationship of the target SOC value C1 to the SOC distribution request level P3 in advance experimentally or by simulation and is stored in the ROM. The process of step S400 reads the target SOC calculation table TB from the ROM and refers to this table TB to obtain the target SOC value C1 related to the SOC distribution request level P3 calculated at step S300.

As illustrated, the target SOC value C1 shown by the linear line L is a value set in an available SOC range W of the battery 40 and indicates a distribution rate when the available SOC range W is distributed into a capacity for charge control and a capacity for idle reduction. More specifically, the area of the capacity for idle reduction is set on the lower side of the available SOC range W of the battery 40, and the area of the capacity for charge control is set on the upper side. The boundary between these two areas shows the target SOC value C1. In other words, the level determined by adding the capacity for idle reduction to the lower limit of the available SOC range W is set as the target SOC value C1.

The capacity for charge control is a battery capacity required due to suppression of fuel power generation by the charge control described above. The capacity for idle reduction is a capacity expected to be used in the future stop and start period. According to this embodiment, the capacity for idle reduction is set to an expected maximum capacity. The capacity for idle reduction increases with an increase in SOC distribution request level P3. When the SOC is controlled to the upper side of the linear line L, the remaining capacity corresponding to the SOC in the available SOC range exceeds the capacity for idle reduction. This causes the idle reduction control to be fully implemented and further has an excess corresponding to the exceeding capacity. The target SOC value C1 shown by the linear line L accordingly indicates the SOC that enables idle reduction control to be fully implemented hereafter and minimizes the amount of power generation for accumulation of SOC.

The target SOC value C1 linearly increases with an increase in SOC distribution request level P3 as shown by the linear line L. The invention is, however, not limited to this example. For example, the target SOC value C1 may be configured to linearly increase with an increase in SOC distribution request level P3 when the SOC distribution request level P3 is equal to or less than a predetermined value and to maintain a fixed value when the SOC distribution request level P3 is greater than the predetermined value. This configuration is effective for a battery having a relatively narrow available SOC range. Additionally, a change in target SOC value C1 may be shown by a curved line, instead of the linear line.

Referring back to FIG. 3, after execution of step S400, the CPU outputs the target SOC value C1 calculated at step S400 to the feedback controller 130 (step S500) and subsequently terminates the target SOC estimation routine. The feedback controller 130 (FIG. 2) controls the present SOC value C2 to the calculated target SOC value C1. The present SOC value C2 indicates the remaining capacity in the available SOC range of the battery 40. The control described above results in avoiding the remaining capacity from becoming less than the capacity for idle reduction during vehicle running. More specifically, when the present SOC value is located in the area of the capacity for charge control in FIG. 5, i.e., when the remaining capacity is greater than the capacity for idle reduction, charge control is performed to suppress the battery 40 from being charged by fuel power generation. When the SOC decreases and is becoming less than the capacity for idle reduction, the SOC is controlled to the target SOC value C1 shown by the linear line L by fuel power generation. Such control accordingly prevents the SOC from becoming less than the capacity for idle reduction.

Figure 6:
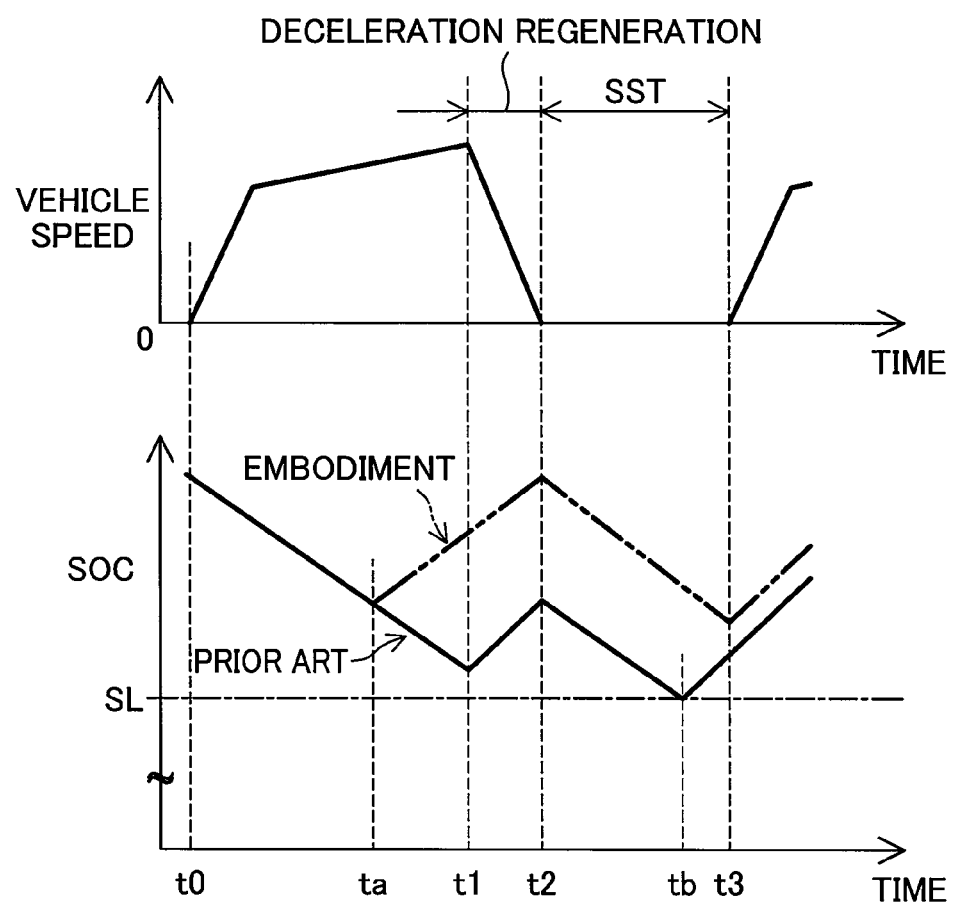
FIG. 6 is a diagram illustrating time charts of vehicle speed and SOC (present SOC value C2) of the battery during operation of the automobile.

FIG. 6 is a diagram illustrating time charts of vehicle speed and SOC (present SOC value C2) of the battery 40 during operation of the automobile 200. The time charts have the vehicle speed and the SOC as the ordinate and the time as the abscissa. When the operation of the automobile 200 is started and the automobile 200 starts moving at a time t0, the vehicle speed gradually increases to normal running. The vehicle then shifts to the deceleration state at a time t1. In a t0-t1 period from the time t0 to the time t1, the SOC gradually decreases as shown by the solid line. This solid line, however, indicates a change according to the prior art, and this embodiment has a change as shown by the two-dot chain line. This is described below.

After the time t1, the vehicle stops at a time t2. In a t1-t2 period, the SOC gradually increases as shown by the solid line by regenerative power generation during deceleration. A period from the time t2 (more specifically, at the time when the engine stop condition is satisfied) to a time t3 when the vehicle speed has a rise is a stop and start period SST, when the engine 10 is at stop. In the stop and start period SST, the SOC gradually decreases by power consumption of the auxiliary machinery. According to the prior art, as shown by the solid line, when the SOC decreases to a lower limit SL during this engine stop (time tb), battery control is performed to restart the engine 10. After the engine restart, the SOC increases by power generation using the power of the engine 10, as shown by the solid line.

According to the embodiment, when the SOC decreases during normal running and causes the remaining capacity in the available SOC range of the battery 40 to become less than the capacity for idle reduction (time ta), the SOC is increased by fuel power generation. As shown by the two-dot chain line in illustration, the SOC increases in a ta-t2 period. This increase is in view of the maximum battery capacity expected to be used in the future stop and start period, so that the SOC decreasing in the stop and start period t2-t3 does not reach the lower limit SL. The "future stop and start period" is not limited to one stop and start period SST as illustrated but includes all a plurality of stop and start periods within a predetermined time period.

According to the embodiment, the engine 10 is restarted in the state that the SOC does not decrease to the lower limit in the stop and start period t2-t3, unlike the prior art. The following describes the vehicle state predictor 114 in detail.

D. Configuration of Vehicle State Predictor

Figure 7:
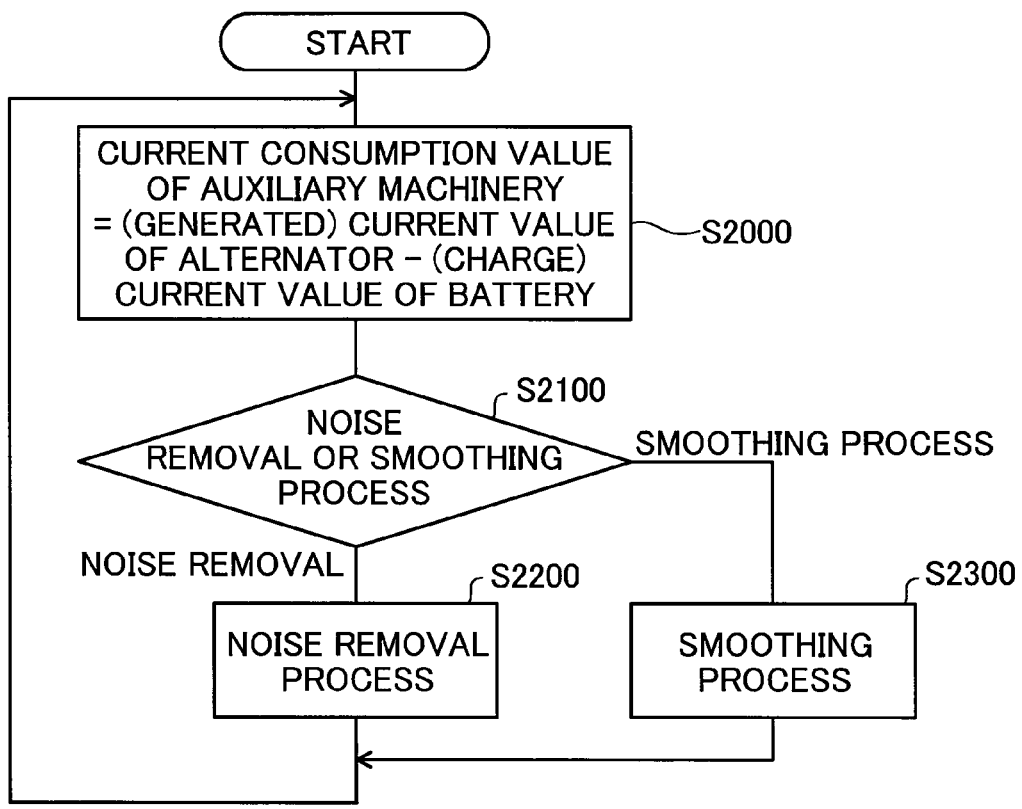
FIG. 7 is a flowchart of calculating the electric current of auxiliary machinery corresponding to the vehicle state P2.

FIG. 7 is a flowchart of calculating the electric current of auxiliary machinery corresponding to the vehicle state P2. This embodiment computes the vehicle state P2 using not an observed value of electric current flowing in the auxiliary machinery 70 (hereinafter called "electric current of the auxiliary machinery 70") but a calculated value of electric current flowing in the auxiliary machinery 70. The observed value may include a value of instantaneous high current such as cracking current. The cracking current means high current flowing instantaneously. The cracking current is, for example, high current consumed by the starter 30 at a start or at a restart of the engine 10. It is preferable to exclude such high current from the condition of calculation of the electric current flowing in the auxiliary machinery 70.

As described above, the vehicle state predictor 114 calculates the electric current of the auxiliary machinery 70 using the generated current value Aa of the alternator detected by the alternator current sensor 89 and the charge current value Ab of the battery detected by the battery current sensor 88, calculates the amount of electric power to be consumed by the auxiliary machinery and outputs the calculated amount of electric power as the vehicle state P2. When the cracking current is not excluded from the condition of computation of the vehicle state P2, the vehicle state predictor 114 includes the cracking current for calculation of the amount of electric power to be consumed by the auxiliary machinery 70 and outputs the calculated amount of electric power as the vehicle state P2. The SOC controller 100 controls the generated voltage of the alternator 35 based on the magnitude of cracking current. This may result in increasing the amount of power generation of the alternator 35 and worsens the fuel consumption.

Figure 8:
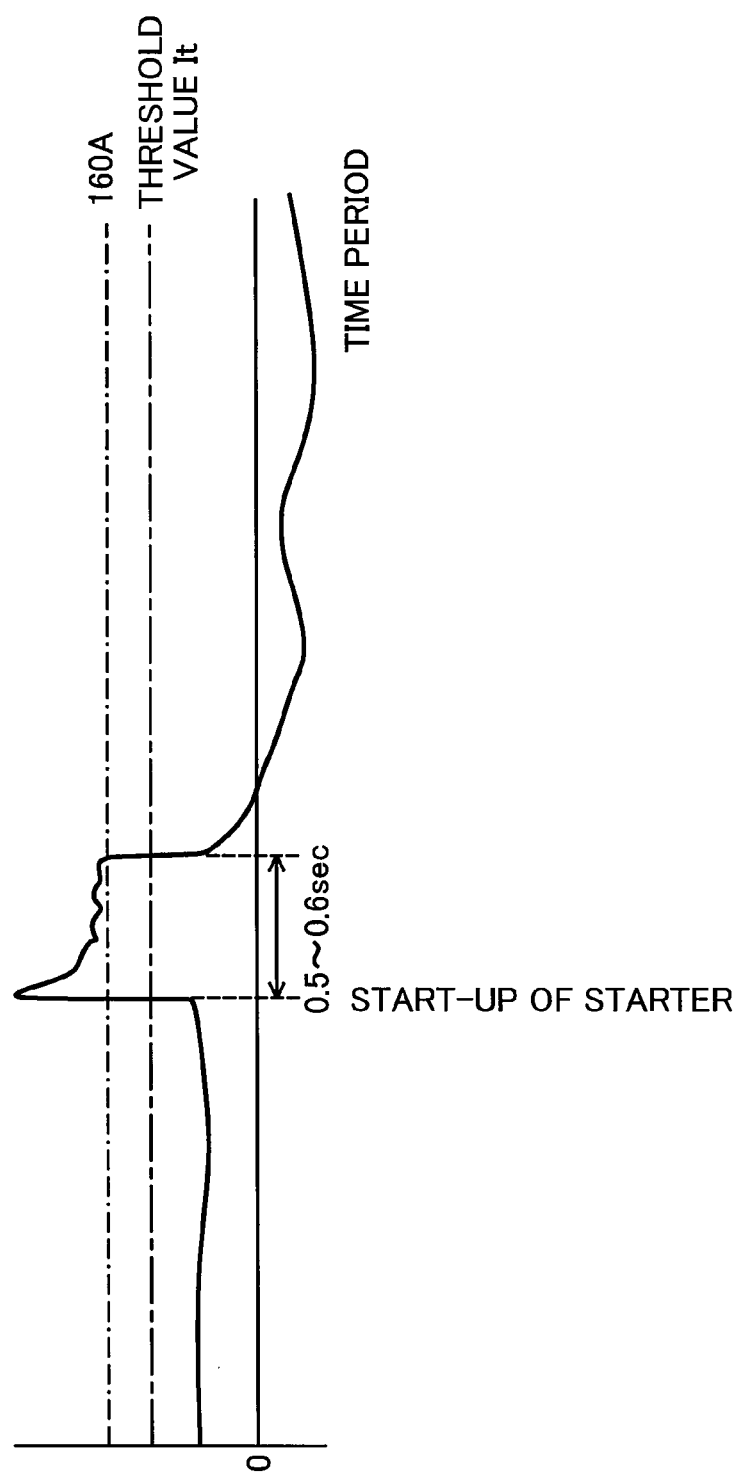
FIG. 8 is a graph showing a variation in battery discharge current at a restart of the engine.

FIG. 8 is a graph showing a variation in battery discharge current at a restart of the engine. Before a restart of the engine 10, a fixed amount of electric current is consumed by the auxiliary machinery 70. At a restart of the engine 10, the starter 30 is stated up to consume high current. In the state that the engine 10 is not operated, the alternator 35 is not driven to generate electric power, so that the electric current consumed by the starter 30 is only the discharge current from the battery 40. As a result, the discharge current of the battery 40 is high current exceeding 160 A. This high current works as cracking current. The discharge time of the cracking current is as short as 0.5 to 0.6 seconds. When the engine 10 is started, the alternator 35 is driven via the drive mechanism 34 to generate electric power. This decreases the discharge current of the battery 40 or causes the battery 40 to be charged by the alternator 35.

The vehicle state predictor 114 excludes the cracking current from the condition of computation of the vehicle state P2 as described below. At step S2000, the vehicle state predictor 114 obtains an observed value of electric current of the auxiliary machinery 70. The electric current is generated by the alternator 35, and a part of the generated electric current is charged into the battery 40 while a remaining part is supplied to the auxiliary machinery 70. The observed value of electric current of the auxiliary machinery 70 is obtained by subtracting the electric current to be charged into the battery 40 from the electric current generated by the alternator 35. When the electric current of the auxiliary machinery 70 is larger than the electric current generated by the alternator 35, electric current is supplied from the battery 40 to the auxiliary machinery 70. In this case, the battery 40 is discharged. Discharging may be regarded as charging of electric current of negative magnitude. Accordingly, the electric current of the auxiliary machinery 70 is measurable similarly in this case.

At step S2100, the vehicle state predictor 114 determines whether instantaneous large noise such as cracking current is to be removed or smoothing process is to be performed for calculation of the electric current of the auxiliary machinery 70. When the noise removal process is to be performed and when the smoothing process is to be performed will be described later. The vehicle state predictor 114 performs the noise removal process at step S2200 and the smoothing process at step S2300. The details of the noise removal process and the smoothing process will be described later. The electric current of the auxiliary machinery 70 after the noise removal process or the electric current of the auxiliary machinery 70 after the smoothing process is referred to as "calculated value of electric current of the auxiliary machinery 70". The calculated value of electric current of the auxiliary machinery 70 is used as a control condition of the generated voltage of the alternator 35. The amount of electric power to be consumed by the auxiliary machinery 70 is calculated from the calculated value of electric current of the auxiliary machinery 70. The calculated amount of electric power is output as the vehicle state P2.

The following describes the reason why the two processes, i.e., the noise removal process and the smoothing process are selectively performed. High current is discharged from the battery 40, for example, on the occasion of consumption of electric current by stop lamps, indicators, power windows, power steering or antilock braking, other than the start of the engine 10 by the starter 30. On the occasions other than the start of the engine 10, electric current may be flowed for a relatively long time period, or high current may be flowed due to multiple factors. In such cases, electric current may be excessively discharged from the battery 40 without power generation by the alternator 35. It is accordingly preferable to exclude only instantaneous high current such as cracking current from the condition of computation of the vehicle state P2 and the control condition of the generated voltage of the alternator 35 but not to exclude the occasions of the flow of electric current for a relatively long time period by, for example, stop lamps, indicators, power windows, power steering or antilock braking from the condition of computation of the vehicle state P2 and the control condition of the generated voltage of the alternator 35.

Figure 9:
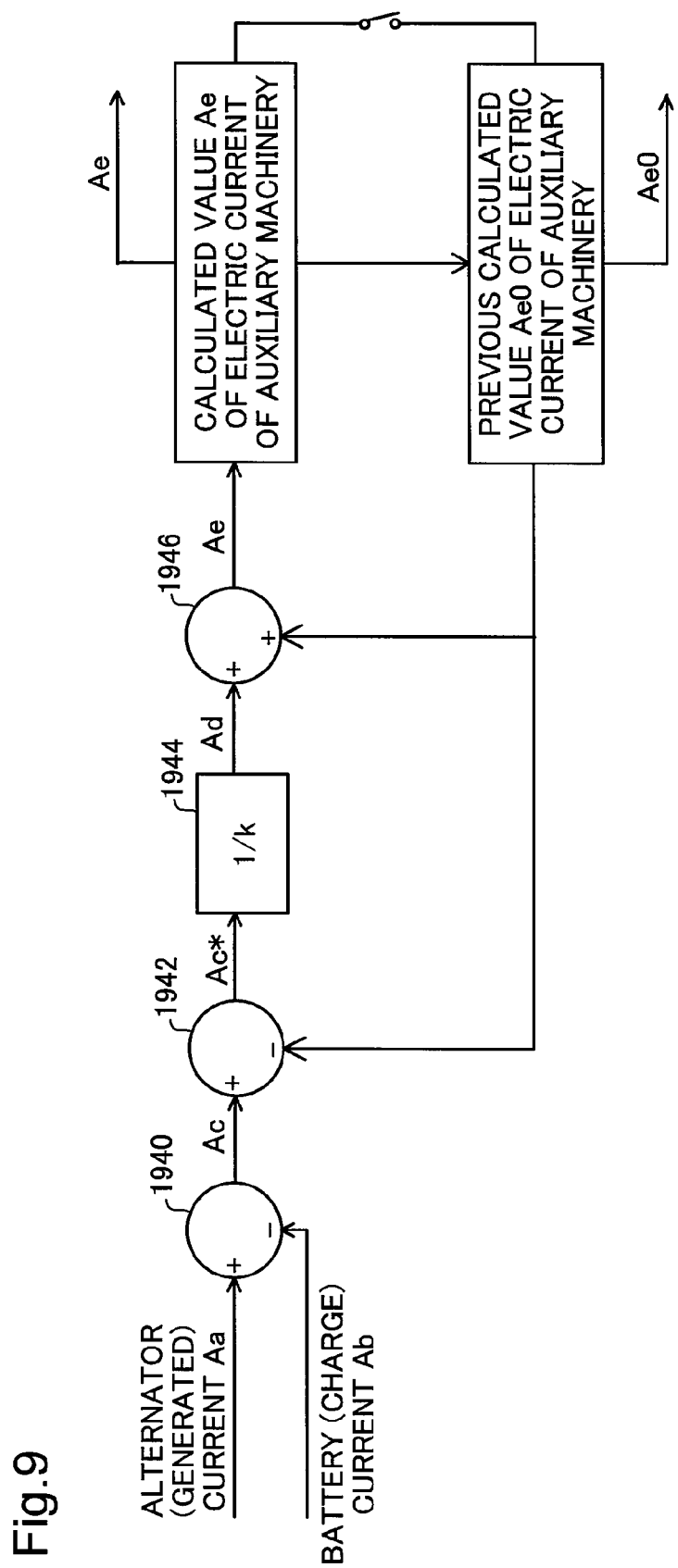
FIG. 9 is a control block diagram involved in the smoothing process.

FIG. 9 is a control block diagram involved in the smoothing process. A first subtractor 1940 subtracts the charge current value Ab of the battery 40 from the generated current value Aa of the alternator 35 to calculate an observed value Ac of electric current of the auxiliary machinery 70. The observed value Ac of electric current of the auxiliary machinery 70 denotes electric current actually consumed by the auxiliary machinery 70.

A second subtractor 1942 subtracts a previous calculated value Ae0 of electric current of the auxiliary machinery 70 from the observed value Ac of electric current of the auxiliary machinery 70 to calculate a smoothened input current value Ac*. The smoothing process is repeated at predetermined intervals. The last operation in this series of smoothing process is performed by an adder 1946 as described below. When one cycle of this smoothing process is concluded, a calculated value Ae of electric current of the auxiliary machinery 70 is output. In a next cycle, this calculated value Ae is used as the previous calculated value Ae0 of electric current of the auxiliary machinery 70. The smoothened input current value Ac* denotes a difference between the previous calculated value Ae0 of electric current of the auxiliary machinery 70 and the observed value Ac of electric current of the auxiliary machinery 70.

A divider 1944 divides the smoothened input current value Ac* by a smoothing factor k to calculate 1/k of the difference between the previous calculated value Ae0 of electric current of the auxiliary machinery 70 and the observed value Ac of electric current of the auxiliary machinery 70, as a smoothened output current value Ad. The value of the smoothing factor k is any value greater than 1. When the smoothing factor k is equal to 2, the calculated value Ae of electric current of the auxiliary machinery 70 is an average value of the observed value Ac of electric current of the auxiliary machinery 70 and the previous calculated value Ae0 of electric current of the auxiliary machinery 70. The smoothing factor may be an integral number m of not less than 2, and the calculated value Ae of electric current of the auxiliary machinery 70 may be a moving average of previous calculated values of electric current of the auxiliary machinery 70 in previous (m−1) cycles and the observed value Ac of electric current of the auxiliary machinery 70 in a present cycle.

The adder 1946 adds the smoothened output current value Ad calculated by the divider 1944 to the previous calculated value Ae0 of electric current of the auxiliary machinery 70 to obtain a calculated value Ae of electric current of the auxiliary machinery 70. The calculated value Ae of electric current of the auxiliary machinery 70 is used as the previous calculated value Ae0 of electric current of the auxiliary machinery 70 in a next cycle. The calculated value Ae of electric current of the auxiliary machinery 70 is also used for computation of the vehicle state P2. When the observed value Ac of current consumption is smaller than the previous calculated value Ae0 of electric current of the auxiliary machinery 70, the calculated value Ae of electric current of the auxiliary machinery 70 becomes smaller than the previous calculated value Ae0 of electric current of the auxiliary machinery 70. When the observed value Ac of current consumption is larger than the previous calculated value Ae0 of electric current of the auxiliary machinery, the calculated value Ae of electric current of the auxiliary machinery 70 becomes larger than the previous calculated value Ae0 of electric current of the auxiliary machinery 70.

Figure 10:
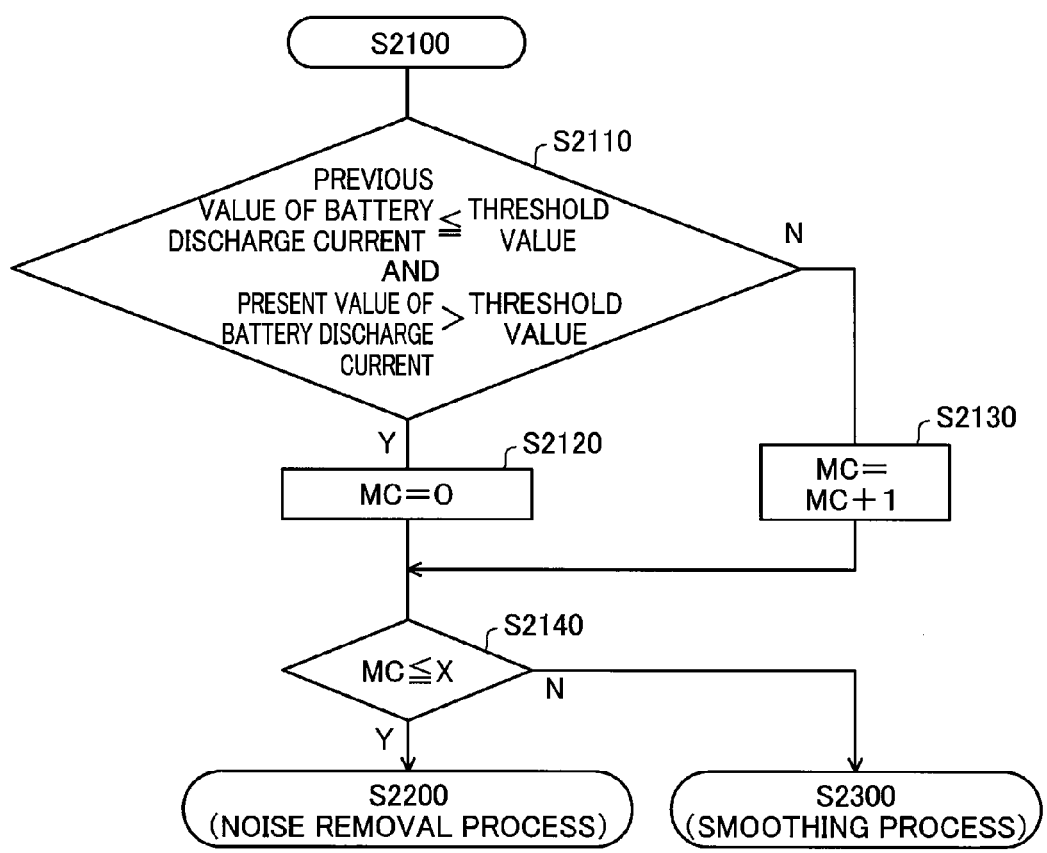
FIG. 10 is a flowchart showing the processing of step S2100 in FIG. 7.

FIG. 10 is a flowchart showing the processing of step S2100 in FIG. 7. At step S2110, the vehicle state predictor 114 determines whether a previous observed value (−Ab) of discharge current of the battery 40 is not larger than a threshold value It and whether a present observed value (−Ab) of discharge current of the battery 40 is larger than the threshold value It. The observed value of discharge current of the battery 40 is obtained by changing the sign of the charge current value of the battery 40 from positive to negative. The magnitude of the threshold value It is preferably larger than a value of power consumption of the battery 40 in the idle reduction state of the engine 10 but smaller than a current value at the start-up of the starter 30 and may be set in, for example, in the range of 95 A to 120 A.

When both the above two conditions are satisfied, the vehicle state predictor 114 shifts the processing to step S2120 to reset the value of a mask counter MC to zero. When at least one of the above two conditions is not satisfied, on the other hand, the vehicle state predictor 114 shifts the processing to step S2130 to add 1 to the present value of the mask counter MC. The above two conditions are satisfied in the case of a state change from the state that the observed value (−Ab) of discharge current of the battery 40 is not larger than the threshold value It to the state that the observed value (−Ab) is larger than the threshold value It, i.e., in the case of generation of cracking current.

At step S2140, the vehicle state predictor 114 determines whether the value of the mask counter MC is equal to or less than a predetermined reference value X. When the value of the mask counter MC is equal to or less than X, the vehicle state predictor 114 shifts the processing to step S2200 (noise removal process). The noise removal process uses the previous calculated value Ae0 of electric current of the auxiliary machinery 70 as the calculated value Ae of electric current of the auxiliary machinery 70. The previous calculated value Ae0 of electric current of the auxiliary machinery 70 is not affected by the present observed value (−Ab) of discharge current of the battery 40. Accordingly, the present observed value (−Ab) of discharge current of the battery 4 is excluded as noise from the calculated value Ae of electric current of the auxiliary machinery 70.

When the value of the mask counter MC is larger than X at step S2140, on the other hand, the vehicle state predictor 114 shifts the processing to step S2300. At step S2300, the smoothing process described above is performed, so that the calculated value Ae of electric current of the auxiliary machinery 70 after the smoothing process is obtained. The details of the smoothing process are identical with those described above with reference to FIG. 9.

Figure 11A:
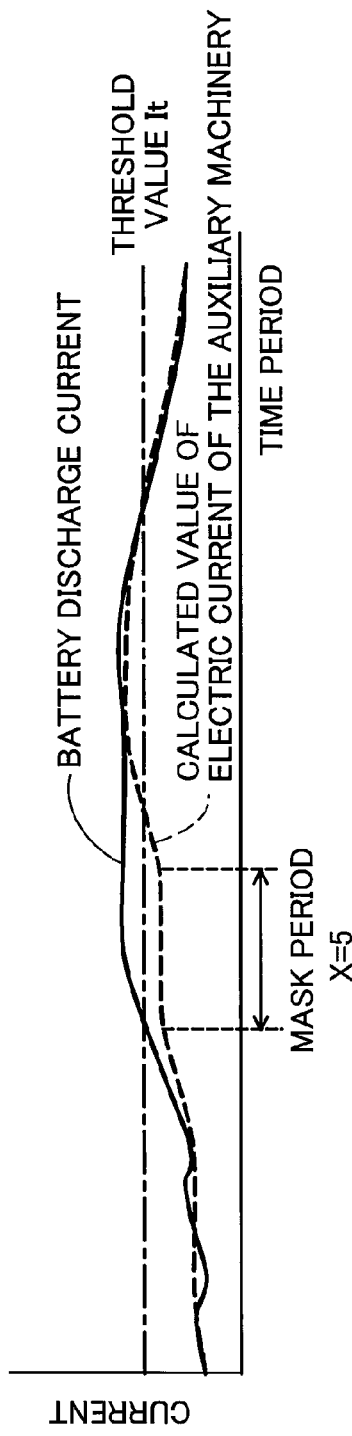
FIG. 11A and FIG. 11B are diagrams showing variations in discharge current of the battery and in calculated value of electric current of the auxiliary machinery according to this embodiment.
Figure 11B:
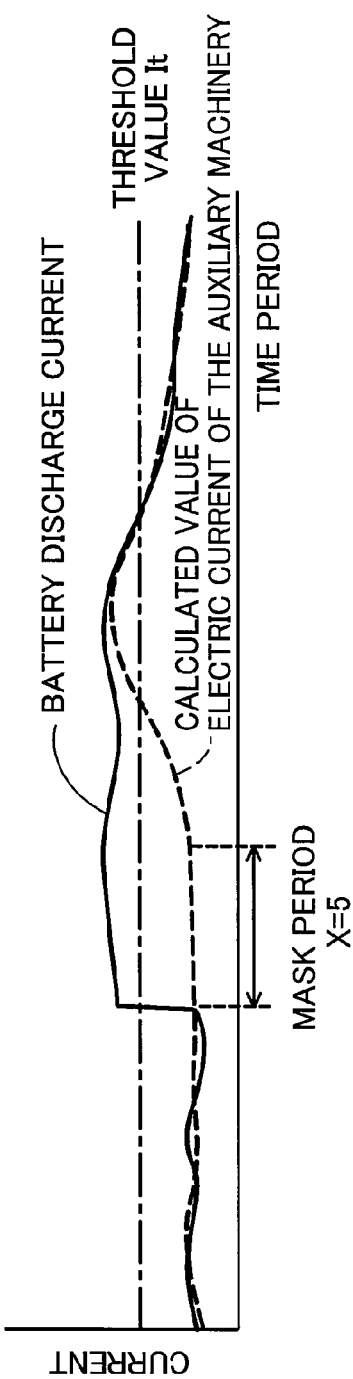

FIG. 11A and FIG. 11B are diagrams showing variations in discharge current of the battery 40 and in calculated value of electric current of the auxiliary machinery 70 according to this embodiment. FIG. 11A shows a case when the discharge current of the battery 40 increases smoothly, and FIG. 11B shows a case when the discharge current of the battery 40 increases abruptly. Although the value X used at step S2130 in FIG. 10 is set equal to 5, a time period for masking with the value of the mask counter MC (called "mask period") is preferably set to a smaller value than the smoothing factor k used in the smoothing process. This embodiment uses the value of the mask counter MC for the determination of step S2140, but a timer may be used instead of the mask counter MC.

As described above with reference to FIG. 10, when the observed value (−Ab) of discharge current of the battery 40 becomes larger than the threshold value It, the value of the mask counter MC is reset to 0. The processing of step S2140 is repeated until the value of the mask counter MC becomes larger than X (=5). As a result, as shown in FIG. 11, the calculated value of electric current of the auxiliary machinery 70 immediately before the state that the observed value (−Ab) of discharge current of the battery 40 becomes larger than the threshold value It is used as the calculated value Ae of electric current of the auxiliary machinery 70 and is maintained during the mask period between when the observed value (−Ab) of discharge current of the battery 40 becomes larger than the threshold value It and when the value of the mask counter becomes larger than X (=5). In other words, during this period, the noise called cracking current is excluded from the condition of computation of the calculated value Ae of electric current of the auxiliary machinery 70.

After the value of the mask counter becomes larger than X, on the other hand, the processing of step S2300 in FIG. 10 is performed (smoothing process). Accordingly, as shown in FIG. 11, after elapse of the mask period, the calculated value Ae of electric current of the auxiliary machinery 70 approaches the observed value of discharge current of the battery 40. As a result, this enables the calculated value Ae of electric current of the auxiliary machinery 70 to follow the observed value (−Ab) of discharge current of the battery 40. An increase in calculated value Ae of electric current of the auxiliary machinery 70 increases the control voltage of the alternator 35, so as to increase the amount of power generation by the alternator 35 and decrease the observed value of discharge current of the battery 40.

Figure 12:
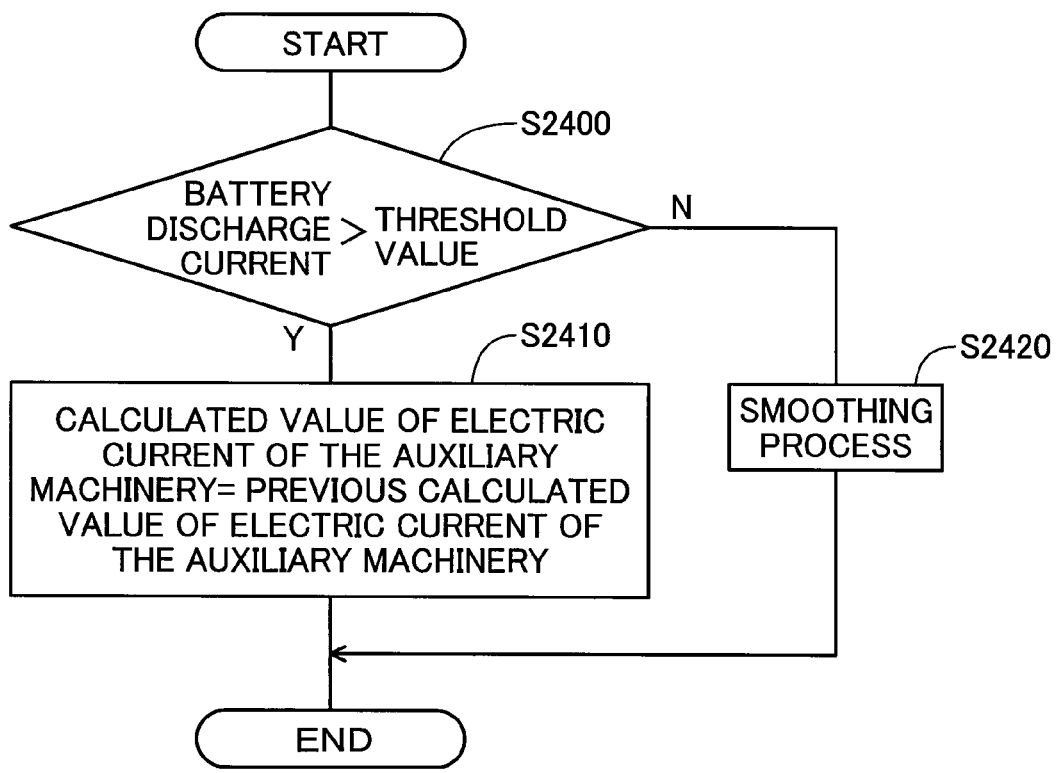
FIG. 12 is a processing flowchart according to a comparative example.

FIG. 12 is a processing flowchart according to a comparative example. This comparative example performs a process of relieving the effect of high current without providing the mask period. At step S2400, the vehicle state predictor 114 determines whether the observed value (−Ab) of discharge current of the battery 40 is larger than the threshold value It. When the observed value (−Ab) of discharge current of the battery 40 is larger than the threshold value It, the vehicle state predictor 114 shifts the processing to step S2410 to use the previous calculated value Ae0 of electric current of the auxiliary machinery 70 as the calculated value Ae of electric current of the auxiliary machinery 70. This process is identical with the process of step S2200 in FIG. 10. When the observed value (−Ab) of discharge current of the battery 40 is equal to or less than the threshold value It, on the other hand, the vehicle state predictor 114 shifts the processing to step S2420 to perform the smoothing process. This process is identical with the process of step S2300 in FIG. 10.

Figure 13A:
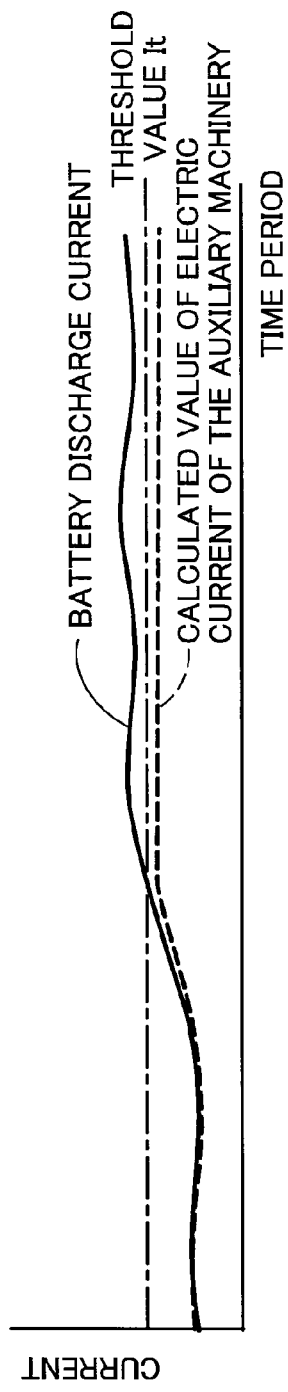
FIG. 13A and FIG. 13B are diagrams showing variations in battery current according to the comparative example.
Figure 13B:
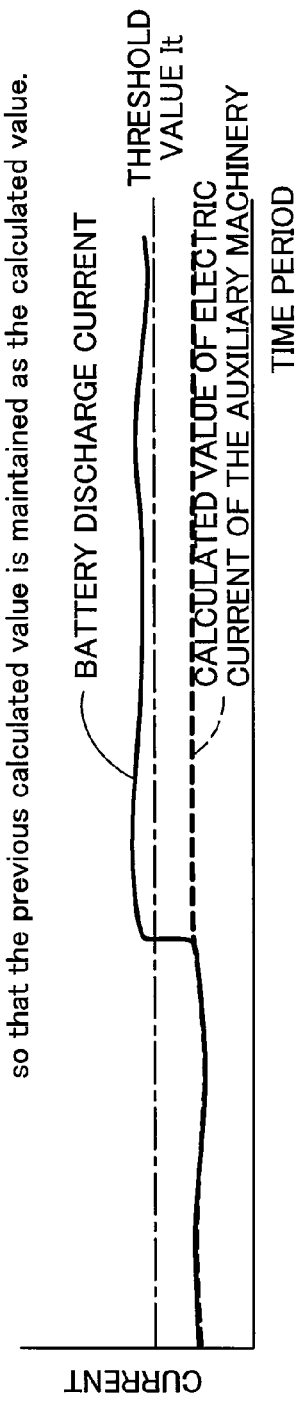

FIG. 13A and FIG. 13B are diagrams showing variations in battery current according to the comparative example. FIG. 13A shows a case when the discharge current of the battery 40 increases smoothly, and FIG. 13B shows a case when the discharge current of the battery 40 increases abruptly. According to the comparative example, when the observed value (−Ab) of discharge current of the battery 40 becomes larger than the threshold value It, the previous calculated value Ae0 of electric current of the auxiliary machinery 70 is used as the calculated value Ae of electric current of the auxiliary machinery 70. The calculated value Ae of electric current of the auxiliary machinery 70 immediately before the state that the observed value (−Ab) of discharge current of the battery 40 becomes larger than the threshold value It is maintained as the calculated value Ae of electric current of the auxiliary machinery 70, until the observed value (−Ab) of discharge current of the battery 40 becomes equal to or less than the threshold value It. Accordingly, in the comparative example, the calculated value Ae of electric current of the auxiliary machinery 70 does not approach the observed value of discharge current of the battery 40 unless the observed value of discharge current of the battery 40 becomes equal to or less than the threshold value It. According to the embodiment shown in FIG. 11, on the other hand, even when the observed value (−Ab) of discharge current of the battery 40 is larger than the threshold value It, the calculated value Ae of electric current of the auxiliary machinery 70 approaches the observed value (−Ab) of discharge current of the battery 40 after the end of the mask period. Providing the mask period like this embodiment in the process of relieving the effect of high current enables the calculated value Ae of electric current of the auxiliary machinery 70 to follow the observed value (−Ab) of discharge current of the battery 40 after elapse of the mask period. This results in allowing for an increase in control voltage of the alternator 35 after elapse of the mask period, thus facilitating charging into the battery 40. In the case that no mask period is provided like the comparative example, on the other hand, it is unlikely to make the calculated value Ae of electric current of the auxiliary machinery 70 follow the observed value of discharge current of the battery 40. This results in not allowing for an increase in control voltage of the alternator 35 and may cause a failure in charging into the battery 40. As described above, the mask period is preferably limited to a fixed time period.

E. Functions and Advantageous Effects

As described above with reference to FIG. 6, the automobile 200 of the embodiment does not restart the engine 10 in the state that the SOC decreases to the lower limit in the stop and start period t2-t3. An engine restart due to shortage of SOC in the middle of the stop and start period requires 3 times to even 5 times the amount of fuel required in the case of an increase in power during operation of the engine to increase the SOC. In other words, the fuel consumption effect per unit SOC (for example, 1% SOC) during engine operation is three times to five times better than that in the case of an engine restart due to shortage of SOC in the middle of the stop and start period. The automobile 200 of the embodiment accordingly improves the fuel consumption, compared with the prior art.

Additionally, when the current value of auxiliary machinery 70 is instantaneously changed, the embodiment also suppresses the effect of the latest current value in the smoothing process. This effectively prevents the distribution ratio between the capacity for charge control and the capacity for idle reduction from being mistakenly specified due to the instantaneous large current.

On the occurrence of cracking current in the auxiliary machinery 70, the cracking current works as the noise in calculation of electric current of the auxiliary machinery 70. The embodiment uses the calculated value of discharge current of the battery 40 immediately before the occurrence of cracking current is used as the basis for control of the generated voltage of the alternator 35 for a predetermined time period. This reduces the effect of cracking current (effect of noise). In the case that high current is maintained (in the case other than cracking current), this embodiment enables the calculated value of discharge current of the battery 40 as the basis for control of the generated voltage of the alternator 35 to approach the observed value of discharge current of the battery 40.

F. Modifications

The present invention is not limited to the embodiment or aspects described above but may be implemented by various other aspects within the scope of the invention. Some examples of possible modifications are given below.

Modification 1

The above embodiment is configured to determine the SOC distribution request level P3 based on the driving environment index P1 and the vehicle state P2 and calculate the target SOC based on the SOC distribution request level P3. Alternatively, the configuration may be modified to directly calculate the target SOC, based on the driving environment index P1 and the vehicle state P2. More specifically, the configuration may be modified to directly calculate a distribution ratio of the available SOC range of the battery to the capacity for charge control and the capacity for idle reduction, based on the driving environment index P1 and the vehicle state P2.

Modification 2

The above embodiment calculates the SOC distribution request level based on both the driving environment index P1 and the vehicle state P2. Alternatively, the configuration may be modified to calculate the SOC distribution request level based on only the vehicle state P2.

Modification 3

The above embodiment describes the configuration of calculating the observed value Ac of electric current flowing through the wire connection LN-side (shown in FIG. 1), i.e., the current value of electric current flowing through the entire electronic equipment including the auxiliary machinery, based on the generated current value Aa of the alternator and the charge current value Ab (discharge current (−Ab)) of the battery. The invention is, however, not limited to this configuration. For example, a current sensor may be provided on the upstream side of the wire connection LN, and the current value may be obtained from this current sensor. Any configuration may be employed to obtain the current value of electric current flowing through the general electronics which are operated with electric power of the battery and include auxiliary machinery.

Modification 4

In the above embodiment, the battery is a lead acid battery. The invention is, however, not limited to this type of battery but may be applied to any of various other types of batteries, such as lithium ion battery and rocking chair-type battery. In the above embodiment, the vehicle is an automobile. Alternatively the invention may be applied to a vehicle other than automobile, such as train.

Modification 5

Part of the functions configured by the software in the above embodiment may be configured by hardware (for example, integrated circuit), or part of the functions configured by the hardware may be configured by software.

Modification 6

Among components in the embodiment and the respective modifications described above, components other than those described in independent claims are additional components and may be omitted as appropriate. For example, a modification may omit charge control which suppresses the battery from being charged during normal running to save the amount of fuel consumption and charges the battery by regenerative power generation during deceleration running.

REFERENCE SIGNS LIST

10 . . . Engine
15 . . . Automatic transmission
20 . . . Differential gear
25 . . . Drive wheels
30 . . . Starter
34 . . . Drive mechanism
35 . . . Alternator
40 . . . Battery
50 . . . ECU
70 . . . Auxiliary machinery
72 . . . Headlights
74 . . . Air conditioner
82 . . . Wheel speed sensor
84 . . . Brake switch
86 . . . Accelerator opening sensor
87 . . . Direction indicator switch
88 . . . Battery current sensor
89 . . . Alternator current sensor
90 . . . Idle reduction controller
100 . . . SOC controller
110 . . . Target SOC estimator
112 . . . Driving environment predictor
114 . . . Vehicle state predictor
116 . . . SOC distribution request level calculator
118 . . . Target SOC calculator
120 . . . Battery SOC calculator
130 . . . Feedback controller
200 . . . Automobile
1940, 1942 . . . subtractor
1944 . . . divider
1946 . . . adder

The invention claimed is:

1. A charge control device for a battery mounted on a vehicle, the vehicle comprising an engine, a generator driven with power of the engine, the battery configured to be chargeable with electric power generated by the generator, and auxiliary machinery operated with electric power of the battery, the charge control device comprising:
a load condition detector that is configured to detect a load condition of the auxiliary machinery; and
a charge controller that is configured to control charging into the battery, based on the load condition of the auxiliary machinery, wherein
in response to detection of a state change from a state in which a magnitude of the load of the auxiliary machinery is smaller than a predetermined threshold value to a state in which a magnitude of the load is larger than the predetermined threshold value,
the charge controller controls a generated voltage by the generator based on the magnitude of the load of the auxiliary machinery prior to the state change during a time period until a specified time has elapsed after the detection of the state change, and
the charge controller controls a generated voltage by the generator based on a magnitude of the load of the auxiliary machinery detected by the load condition detector during a time period after elapse of the specified time.

2. The charge control device according to claim 1, wherein the vehicle includes a starter configured to start the engine, and
the threshold value is a value that is larger than current consumption of the auxiliary machinery in an idle reduction state of the engine but is smaller than current consumption of the starter.

3. The charge control device according to claim 1, wherein the charge controller uses an observed value of electric current of the auxiliary machinery to obtain a calculated value of electric current of the auxiliary machinery for controlling the generated voltage by the generator, and
when obtaining the calculated value of electric current of the auxiliary machinery, the charge controller performs a smoothing process that reduces a variation in the calculated value of electric current of the auxiliary machinery to be smaller than a variation in the observed value of electric current of the auxiliary machinery.

4. A vehicle control device mounted on a vehicle, comprising
   the charge control device according to claim 1;
   an idle reduction controller that is configured to perform idle reduction control of the engine; and
   an SOC detector that is configured to detect a state of charge (SOC) of the battery, wherein
   the charge control device further comprises
      an idle reduction capacity setter that is configured to set, during running of the vehicle, a capacity for idle reduction in an available SOC range of the battery, based on the load of the auxiliary machinery, wherein the capacity for idle reduction is expected to be used in a stop and start period from an engine stop to an engine restart by the idle reduction control; and
      a remaining capacity controller that is configured to control an amount of power generation by the generator so as to avoid a remaining capacity in the available SOC range, which corresponds to the SOC detected by the SOC detector, from becoming smaller than the capacity for idle reduction during running of the vehicle.

5. A vehicle, comprising
   the charge control device according to claim 1;
   the engine;
   the battery that is configured to be chargeable with the electric power generated by the generator that is driven with power of the engine; and
   the auxiliary machinery that is operated with the electric power of the battery.

6. A control method for a vehicle, the vehicle comprising an engine, a generator driven with power of the engine, a battery configured to be chargeable with electric power generated by the generator, and auxiliary machinery operated with electric power of the battery, the control method comprising the steps of:
   (a) detecting magnitude of a load of the auxiliary machinery;
   (b) determining whether there is a state change from a state in which a magnitude of the load of the auxiliary machinery is smaller than a predetermined threshold value to a state in which a magnitude of the load is larger than the predetermined threshold value; and
   (c) controlling charging into the battery based on the magnitude of the load of the auxiliary machinery, wherein
   in response to detection of the state change from the state in which a magnitude of the load of the auxiliary machinery is smaller than the predetermined threshold value to the state in which a magnitude of the load is larger than the predetermined threshold value in the step (b),
      in the step (c), a generated voltage by the generator is controlled based on the magnitude of the load of the auxiliary machinery prior to the state change during a time period until a specified time has elapsed after the detection of the state change, while
      a generated voltage by the generator is controlled based on the detected magnitude of the load of the auxiliary machinery during a time period after elapse of the specified time.

7. The control method for the vehicle according to claim 6, further comprising:
   (d) performing idle reduction control;
   (e) detecting a state of charge (SOC) of the battery;
   (f) measuring a current value of electric current flowing through the auxiliary machinery;
   (g) obtaining a calculated value of electric current of the auxiliary machinery by performing a smoothing process that reduces a variation in calculated value of electric current of the auxiliary machinery to be smaller than a variation in observed value of electric current of the auxiliary machinery; and
   (h) setting, during running of the vehicle, a capacity for idle reduction in an available SOC range of the battery, based on a current value corrected in the step (g), wherein the capacity for idle reduction is expected to be used in a stop and start period from an engine stop to an engine restart by the idle reduction control, wherein
   in the step (c), an amount of power generation by the generator is further controlled so as to avoid a remaining capacity in the available SOC range, which corresponds to the SOC detected in the step (e), from becoming smaller than the capacity for idle reduction during running of the vehicle.

\* \* \* \* \*